United States Patent
Birger et al.

(10) Patent No.: US 11,386,361 B2
(45) Date of Patent: Jul. 12, 2022

(54) CLOSED LOOP INTEGRATED PEST MANAGEMENT

(71) Applicant: Agromentum Ltd., Tel-Aviv (IL)

(72) Inventors: Iftach Birger, Kfar Kish (IL); Boaz Bachar, Tel-Aviv (IL)

(73) Assignee: AGROMENTUM LTD., Tel-Aviv (IL)

( * ) Notice: Subject to any disclaimer, the term of this patent is extended or adjusted under 35 U.S.C. 154(b) by 0 days.

(21) Appl. No.: 16/933,247

(22) Filed: Jul. 20, 2020

(65) Prior Publication Data
US 2020/0349477 A1 Nov. 5, 2020

Related U.S. Application Data (63) Continuation of application No. 15/574,580, filed as application No. PCT/IB2016/053051 on May 25, 2016, now abandoned.
(Continued)

(51) Int. Cl.
*G06Q 10/04* (2012.01)
*H04W 4/38* (2018.01)
(Continued)

(52) U.S. Cl.
CPC ........... *G06Q 10/04* (2013.01); *A01N 25/02* (2013.01); *G06Q 10/06* (2013.01); *G06Q 50/02* (2013.01); *H04W 4/38* (2018.02)

(58) Field of Classification Search
CPC ........ G06Q 10/04; G06Q 10/06; G06Q 50/02; H04W 4/38; A01N 25/02
See application file for complete search history.

(56) References Cited

U.S. PATENT DOCUMENTS 7,275,042 B1 9/2007 Kelly
7,943,160 B2 * 5/2011 Borchert .............. A01N 25/004
514/432
(Continued)

FOREIGN PATENT DOCUMENTS

CA 2663917 A1 * 10/2010 ............. A01C 21/00
CN 204142639 * 11/2014

OTHER PUBLICATIONS

Lehmann, Jan Rudolf Karl, et al. "Analysis of unmanned aerial system-based CIR images in forestry—A new perspective to monitor pest infestation levels." Forests 6.3 (2015): 594-612. (Year: 2015).*
(Continued)

*Primary Examiner* — Patricia H Munson
*Assistant Examiner* — Hamzeh Obaid
(74) *Attorney, Agent, or Firm* — Greenberg Traurig, LLP (57) ABSTRACT

At least some embodiments are directed to a system that captures a set of images via cameras positioned in a lot having a crop. The system determines based on image processing and the set of images a phenological and biological stage of the crop, and a type of pest affecting the crop. The system generates a recommendation including a type of pesticide, a concentration of the type of pesticide, and an amount of pesticide and generates a pest control implementation plan. The system generates instructions for an autonomous carrier to execute the pest control implementation plan. The instructions include instructions for the autonomous carrier to execute the pest control implementation plan and instructions to control pesticide spraying nozzles mounted in the autonomous carrier. The system monitors a traveled distance of the autonomous carrier and determines that the pest control implementation plan has been executed.

20 Claims, 8 Drawing Sheets

Related U.S. Application Data (60) Provisional application No. 62/166,025, filed on May 25, 2015.

(51) Int. Cl.
*G06Q 50/02* (2012.01)
*A01N 25/02* (2006.01)
*G06Q 10/06* (2012.01)

(56) References Cited

U.S. PATENT DOCUMENTS

| | | |
|---|---|---|
| 8,170,849 B2 | 5/2012 | Schick |
| 2003/0069697 A1 | 4/2003 | Mafra-Neto |
| 2005/0000277 A1 | 1/2005 | Giles |
| 2007/0208510 A1* | 9/2007 | Anderson .............. E02B 11/00 405/36 |
| 2011/0035246 A1 | 2/2011 | Fithian |
| 2012/0101861 A1 | 4/2012 | Lindores |
| 2012/0168528 A1* | 7/2012 | Hillger ............... A01M 7/0089 239/11 |
| 2013/0174040 A1 | 7/2013 | Johson |
| 2013/0325242 A1* | 12/2013 | Cavender-Bares .. A01C 23/047 701/25 |
| 2014/0012732 A1* | 1/2014 | Lindores .............. A01B 79/005 705/37 |
| 2014/0067745 A1 | 3/2014 | Avey |
| 2014/0168412 A1* | 6/2014 | Shulman ................ G06V 20/20 348/89 |
| 2014/0303814 A1* | 10/2014 | Burema ................ A01C 21/00 901/1 |
| 2014/0358486 A1* | 12/2014 | Osborne .................. A01G 7/00 702/189 |
| 2015/0199775 A1 | 7/2015 | Pfeiffer |
| 2016/0078569 A1 | 3/2016 | Ethington |
| 2016/0253595 A1 | 9/2016 | Mathur |

OTHER PUBLICATIONS

Tripathy, Amiya Kumar, J. Adinarayana, and D. Sudharsan. "Geospatial data mining for Agriculture pest management—a framework." 2009 17th International Conference on Geoinformatics. IEEE, 2009. (Year: 2009).*

International Search Report and Written Opinion in PCT/IB2016/053051 dated Sep. 1, 2016.

* cited by examiner

CLOSED LOOP INTEGRATED PEST MANAGEMENT

CROSS-REFERENCE TO RELATED APPLICATION

This application is a Continuation of and claims priority to and benefit of U.S. patent application Ser. No. 15/574,580 filed on Nov. 16, 2017 and entitled "CLOSED LOOP INTEGRATED PEST MANAGEMENT," and which is incorporated herein by reference in its entirety.

BACKGROUND

Pest control is at least as old as agriculture, as there has always been a need to keep crops' health. In order to maximize food production, it is advantageous to protect crops from pests by optimizing pesticides implementation and preventing pest infestation.

There is a long felt need for a closed loop pest management system which provides a platform for monitoring and recommending how to treat a lot based on its history data and various inputs from various sources and recording the recommended implementation for further use.

SUMMARY

According to an aspect of the present invention there is provided a system that captures a set of images via cameras positioned in a lot having a crop. The system determines based on image processing and the set of images a phenological and biological stage of the crop, and a type of pest affecting the crop. The system generates a recommendation including a type of pesticide, a concentration of the type of pesticide, and an amount of pesticide and generates a pest control implementation plan. The system generates instructions for an autonomous carrier to execute the pest control implementation plan. The instructions include instructions for the autonomous carrier to execute the pest control implementation plan and instructions to control pesticide spraying nozzles mounted in the autonomous carrier. The system monitors a traveled distance of the autonomous carrier and determines that the pest control implementation plan has been executed.

The data relating to at least one resource may comprise at least one of weather conditions, season, regulation demands and pesticide prices.

The data relating to crops may comprise at least one of crop type, phenologic stage, monitoring results and LAI (Leaf Area Index) and crop location.

The data relating to procedures may comprise crops and execution data for pest control.

The fixed sensors may be selected from the group consisting of soil moisture sensors, temperature sensors and at least one camera.

The mobile sensors may be selected from the group consisting of GPS sensors and at least one camera.

The different functionalities may comprise at least one of pest control and directing. The user application may comprise a pest control advisor application.

The external sources may be selected from the group consisting of weather forecast, season, regulation demands and pesticide prices sources.

The reports may comprise at least one of pest distribution maps and implementation maps.

The forecasts may comprise pest distribution forecasts.

According to another aspect of the present invention there is provided a method of controlling crops comprising: providing a system server storing at least one database comprising past and present data relating to at least one resource, crops and procedures; at least one mobile communication device running a user application adapted for different functionalities, the at least one mobile communication device communicating bi-directionally with the system server; at least one sensor communicating with the system server, the at least one sensor adapted to sense at least one parameter, the at least one sensor selected from the group consisting of fixed sensors and mobile sensors; and at least one external electronic data source communicating with the system server, receiving from the at least one mobile communication device current data relating to a crop or a lot; receiving from the at least one sensor current data relating to the crop or the lot; receiving from the at last one external electronic data source data relating to external conditions; communicating to the at least one mobile communication device instructions relating to the crop or the lot; and aggregating data relating to the crop, received from the at least one data source and from the at least one mobile communication device and producing at least one of reports, forecasts, work plans and performance control for at least one resource, relating to the crop.

The relating to at least one resource may comprise at least one of carrier type, sprayer type nozzles' pressure carrier speed and sprayer speed.

The data relating to the crop may comprise at least one of crop type, phenologic stage, monitoring results and LAI (Leaf Area Index) and crop location.

The method may further comprise capturing a crop with a mobile camera and processing the image to compute the crop's phenologic stage.

The method may further comprise receiving satellite images of a crop and processing the image to compute the crop's LAI (Leaf Area Index).

The method may further comprise producing crops and execution data for pest control.

The fixed sensors may be selected from the group consisting of soil moisture sensors, temperature sensors and at least one camera.

The mobile sensors may be selected from the group consisting of GPS sensors and at least one camera.

The mobile sensors may be mounted on a carrier.

The different functionalities may comprise at least one of pest control and directing.

The user application may comprise a pest control advisor application.

The external sources may be selected from the group consisting of weather forecast, season, regulation demands and pesticide prices sources.

The producing reports may comprise at least one of pest distribution maps and implementation maps.

The producing forecasts may comprise producing pest distribution forecasts based at least on the pest distribution maps, data from the at least one external source and the past data.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention offers to provide a closed loop integrated pest management system, which is configured to facilitate crop(s) management, prevent pest infestation and optimize pesticide use. The system receives various inputs from various sources, provides or assists in providing recommendations according to these inputs and the history of the lot to be treated (over time) and monitors the execution of the actions taken upon the recommendations and their actual influence. The closed loop enables the system to monitor the lot over time, keep a record of its history and perform statistic calculations in order to improve future recommendations and results.

It will be appreciated that the term "lot" as used herein is not limited to a predefined land lot size as may be determine by a lot owner. The term "lot" may be part of a determined land lot, the land lot, a number of land lots, a block, a plot or any other field, land, area or territory to be managed.

It will be appreciated that the term "crop" as used herein may include vineyard, citrus, orchard or any other crop that needs to be managed.

Figure 1:
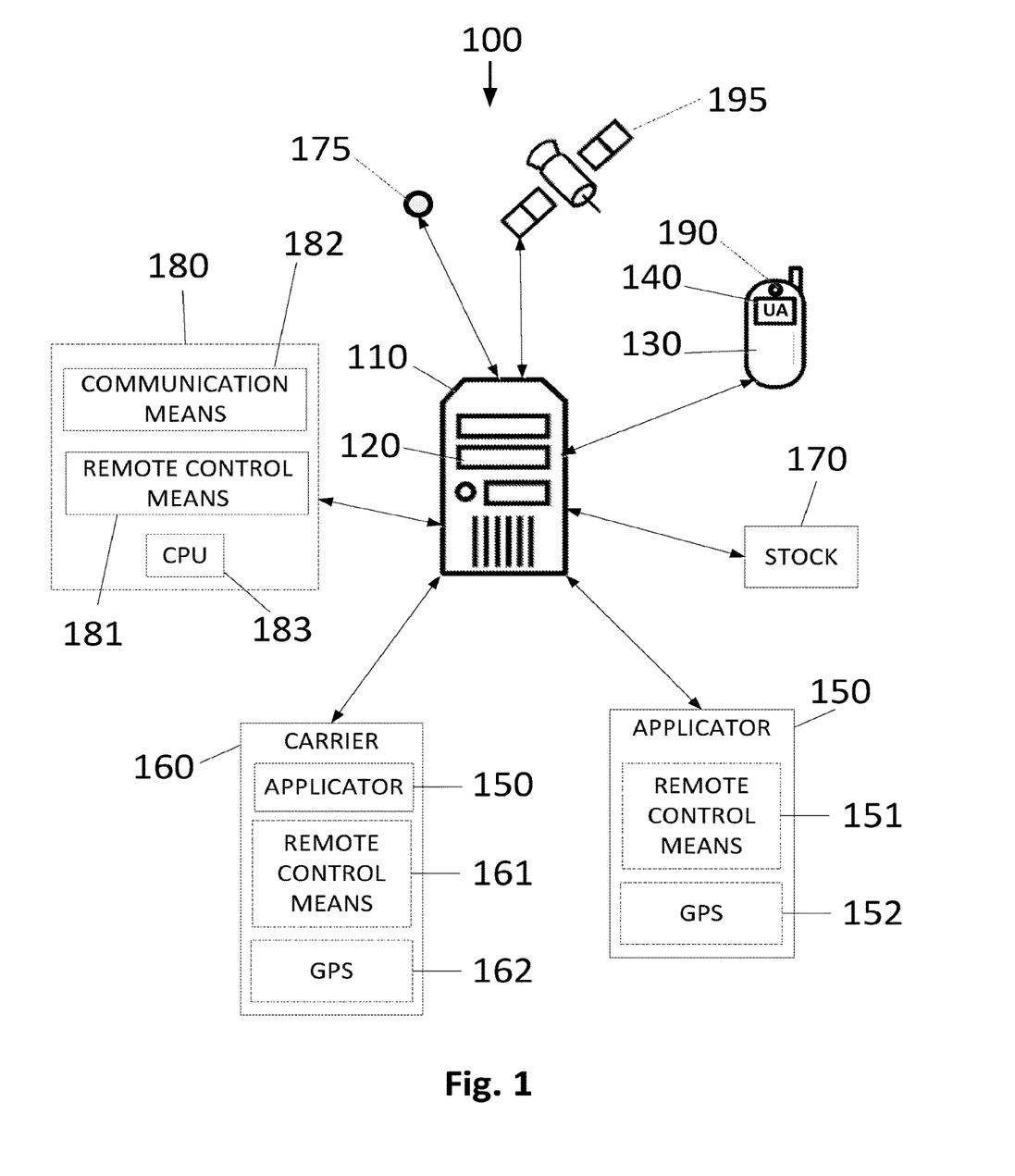
FIG. 1 is a schematic block diagram of the system according to embodiments of the invention.

FIG. 1 is a schematic block diagram of the system 100 according to embodiments of the present invention comprising a server 110 storing a database 120 which may comprise pesticide types, regulation demands, operators names and\or IDs, lots locations, the history of each lot, the spraying tasks that have been completed in the relevant lot, weather forecast and meteorological data, season, crop types, crop cultivar, pesticide prices, soil types, phenologic stages data and relevant data from relevant websites and from knowledge bases derived from books, articles, academic research centers, etc.; server 110 running a server application (not shown); a mobile communication device 130 running the present invention's user application (UA) 140, an applicator 150 (e.g. a sprayer) or an applicator carried by a carrier 160 (e.g. tractor) and a stock of pesticides, pheromones, hormones, etc. 170. The pesticides, pheromones, hormones, etc. 170 may comprise an ID such as an RFID (Radio Frequency Identification) code, barcode, QR (Quick Response) code, etc. The system may optionally comprise a field camera(s) 180 and at least one sensor 175 (temperature, humidity, etc.) mounted in the lot(s) (fixed sensors). The camera(s) comprises remote control means 181, communication means 182 and a CPU 183. The mobile device may also comprise a camera 190 (front or back). The applicator 150 may optionally comprise remote control means 151 and location means such as GPS (global positioning system) 152 (mobile sensor). The carrier 160 may optionally comprise remote control means 161 and location means such as GPS (global positioning system) 162.

According to embodiments of the invention, instead of the UA 140, a user may launch a designated web page for using the system.

According to embodiments of the invention, the remote control means 161 and the GPS 162 may be installed in the carrier or be plugged as a "plug and play" component.

According to embodiments of the invention, the system may also derive data from a satellite(s) 195. The derived data may be for example images of the crop(s), lot(s) or even zoomed images of the crop's canopies for further calculation of Leaf Area Index (LAI), phenologic stage, etc. which may assist in providing a recommendation.

Figure 1A:
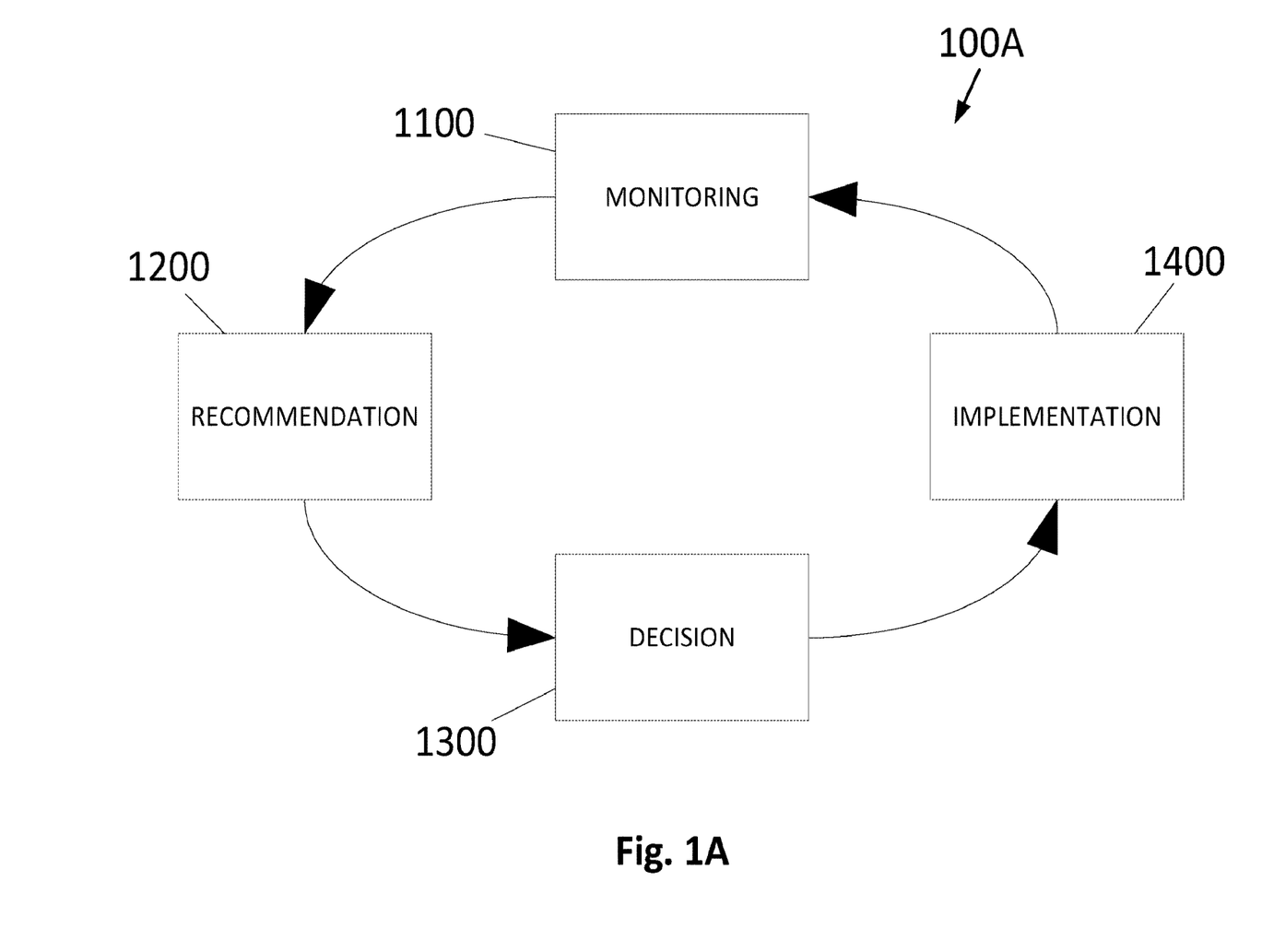
FIG. 1A is a schematic block diagram of the system modules according to embodiments of the present invention.

FIG. 1A is a schematic flow diagram 100A of the system modules according to embodiments of the present invention comprising monitoring 1100, recommendation 1200, decision 1300 and implementation 1400 modules.

The monitoring process may be done by a pest control advisor (PCA) (or any other person with the relevant knowledge) carrying a mobile device (MD) having communication capabilities, location means such as GPS (global positioning system) and optionally a camera (mobile sensors). The MD runs the present invention's user application (UA). The UA does not require a continuous communication line; it may transfer data to the system whenever a connection is available (e.g. internet). Alternatively, or additionally, the process may be done using the MD's camera or remote devices such as for example a field camera(s), mounted near the plant(s), on the plant or in the lot, using image processing; satellite(s), or any other device capable of collecting relevant data. According to embodiments of the invention, the camera(s) may be configured to capture images of traps mounted in the lot which are configured to attract pests. According to embodiments of the invention, the collected data or the images captured by the remote device(s) may be analyzed by the PCA from a remote location (e.g. an office).

According to embodiments of the invention, the MD may be a smartphone, tablet, Personal Digital Assistant (PDA), wearable device such as smart watch or any other device having at least communication capabilities and location means.

Figure 2:
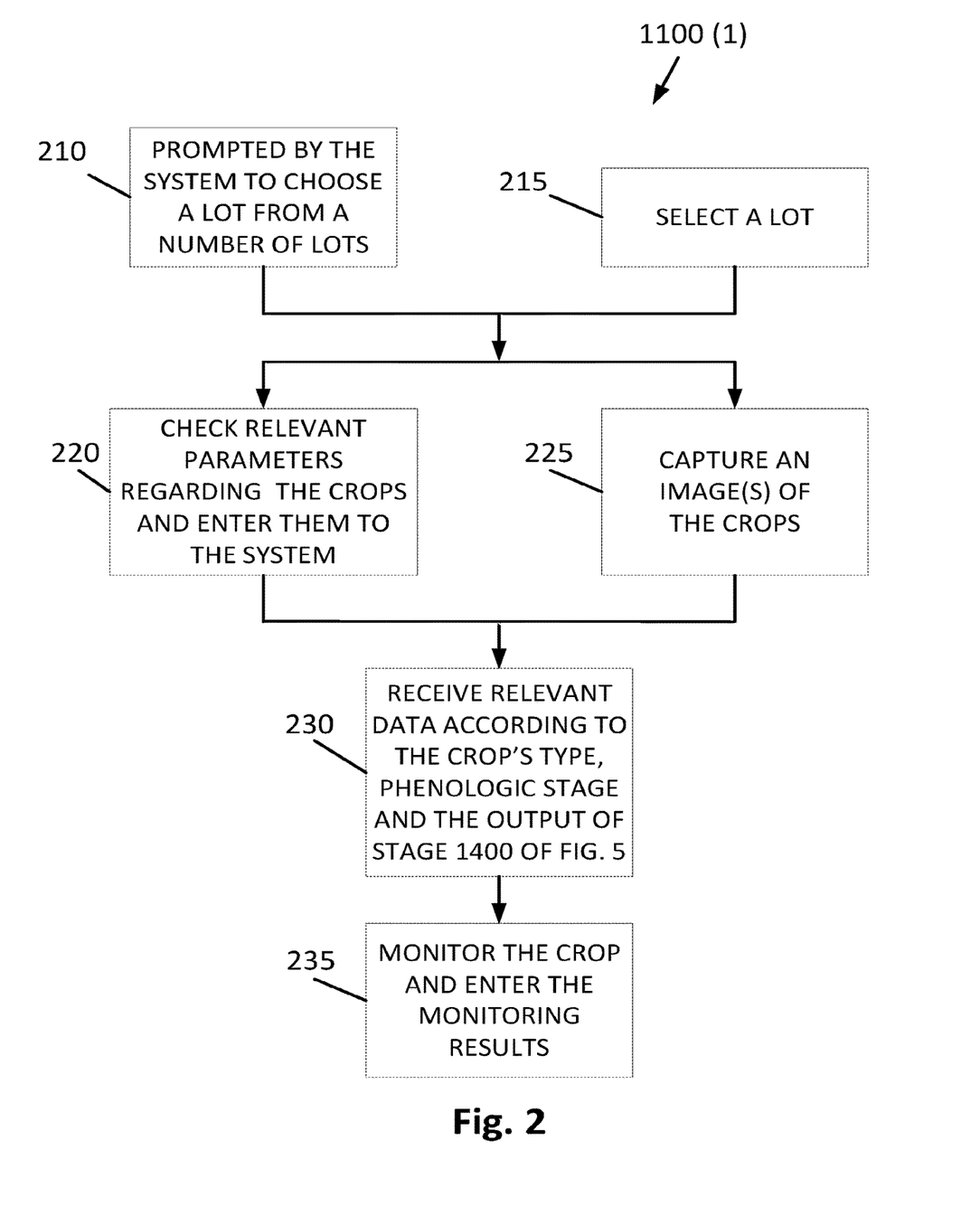
FIG. 2 is a flowchart showing a monitoring stage according to embodiments of the present invention.

FIG. 2 is a flowchart showing a monitoring stage 1100(1), performed, for example, by the PCA according to embodiments of the invention. In step 210, The UA may derive the PCA's location (e.g. using his mobile device's GPS) and prompt him to select a lot from a number of lots existing within a pre determined proximity to his location.

Alternatively in step 215, the PCA may select a lot. According to the lot's location the system derives from the database the crop's type. In step 220, the PCA checks relevant parameters such as the phenologic stage (e.g. blossom) and/or the biological stage of the crops in the lot and enters them to the system. Alternatively, in step 225, the PCA may capture an image(s) of the crops using his mobile device's camera, and the system, using image processing, automatically recognizes the phenologic stage of the crops. According to embodiments of the invention, step 225 may be performed in addition to step 220. In step 230, the PCA receives from the system relevant data regarding the crop (monitoring instructions) according to the phenologic stage, the crop's type and the history of the lot (collected over time from the output of the implementation stage 1400 as will be explained below in conjunction with FIG. 5).

According to embodiments of the invention, the system may provide the monitoring instructions based on the lot's degree days calculation (not shown). Total degree days from an appropriate starting date are used to plan the planting of crops and management of pests and pest control timing. The relevant data (monitoring instructions) the PCA receives may be the types of pests he has to look for and where to look (on the leaves, on the fruits, on the trunk, etc.). The pests' presumed locations are derived from the crop's type and phenologic stage. According to embodiments of the invention, it might be difficult to find pests with the naked eye. In such a case the system may assume that certain types of pests exist on the crop according to the degree days calculation or other known models related to the relevant pest.

Different types of pests may be counted differently (e.g. by number, coverage percentage, etc.). Different PCAs who use the system may count pests differently, namely, one may count by number (e.g. 8 pests per leaf) and one may count by percentage (e.g. 10% of the leaf). The system may learn over time that one PCA's 8 equals the other PCA's 10%. Alternatively, the system may receive from the PCAs their counting methods in order to be able to convert one PCA's count to another PCA's count. Back to FIG. 2, in step 235, the PCA monitors the crop according to the relevant data he has received and enters the monitoring results to the system using the UA. The monitoring results may be, for example, the number or the coverage percentage of each pest type at each location.

Figure 2A:
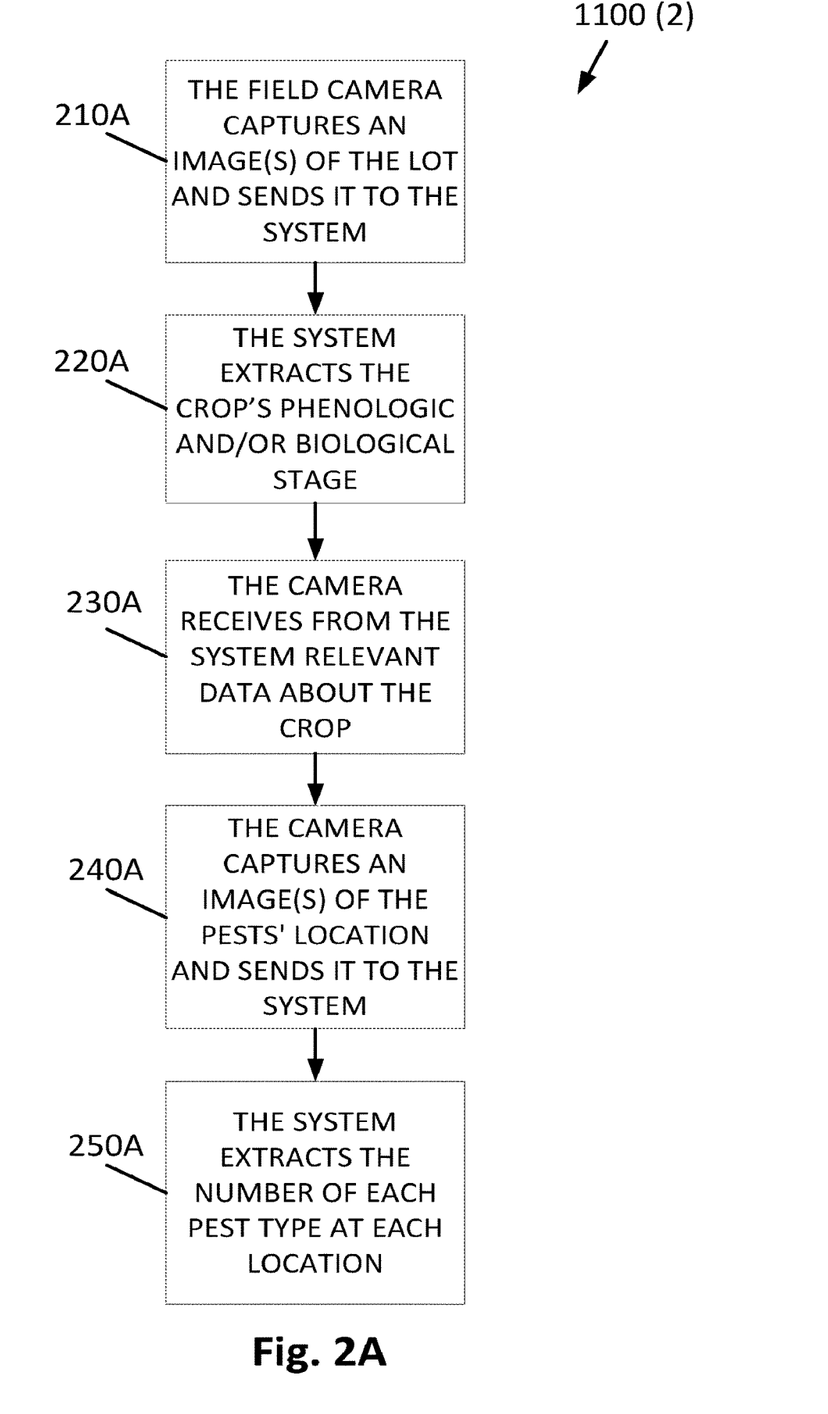
FIG. 2A is a flowchart showing an alternative optional monitoring stage according to embodiments of the present invention.

FIG. 2A is a flowchart showing an alternative optional monitoring stage 1100(2), performed by remote sensing devices (such as 175, 180 and 195 of FIG. 1) according to embodiments of the invention. For the purpose of explanation the process is described in relation to the field camera(s) (180 of FIG. 1). In step 210A, the camera(s) is ordered by the system to capture an image(s) of a lot to be treated. Using image processing, in step 220A, the system extracts the phenologic and/or biological stage of the crop from the image(s). In step 230A, the camera receives from the system relevant data about the crop (monitoring instructions) according to the phenologic and/or biological stage, the crop's type and the history of the lot (collected over time from the output of the implementation stage 1400 as will be explained below in conjunction with FIG. 5). The relevant data may be the types of pests it has to look for and where to look (on the leaves, on the fruits, on the trunk, etc.). The pests' presumed locations are derived from the crop's type and phenologic stage. In step 240A, the camera captures an image(s) of the pests' location(s) and sends it to the system.

In step 250A, using image processing the system extracts the number, the infection percentage, etc. of each pest type at each location from the image(s). The monitoring results may be for example, the number, the coverage percentage, etc. of each pest type at each location. Alternatively, the image(s) captured by the camera(s) may be observed by the pest control advisor (PCA) who extracts the results and enters them to the system manually.

It will be appreciated that other inputs from other remote sensing devices may assist in the monitoring process. For example, temperature, humidity, etc. measured by sensors; images captured by satellite(s), etc.

According to embodiments of the invention, the monitoring stage may be performed according to FIG. 2 and/or FIG. 2A intermittently or interchangeably.

According to embodiments of the invention, as part of the monitoring process, the system may enable the PCA to sample the crops/fruits using, for example, his MD's camera that can capture Near Infra Red waves (like spectrophotometer) and a designated application which is configured to extract the sugar level of the captured crop/fruit according to the captured wavelength.

According to embodiments of the invention, as part of the monitoring process, the system may enable the PCA to sample the crops/fruits using, for example, irradiating the fruit with near infrared radiation such that the radiation penetrates the fruit; measuring the absorbance at a given wavelength with a wavelength selector that is placed in the optical path of the near infrared radiation; normalizing the obtained absorbance, taking account of the size of the fruit; and finding an index of the sweetness of the fruit from the normalized measured absorbance, such as described, for example, in U.S. Pat. No. 5,324,945 A The sugar level may indicate the harvesting, fruit picking, etc. timing, thus may influence the recommendation. There is a period of time before harvesting, fruit picking, etc. where a crop/fruit cannot be sprayed.

According to embodiments of the invention, using this data the system may recommend when to harvest, pick, etc.

Figure 3:
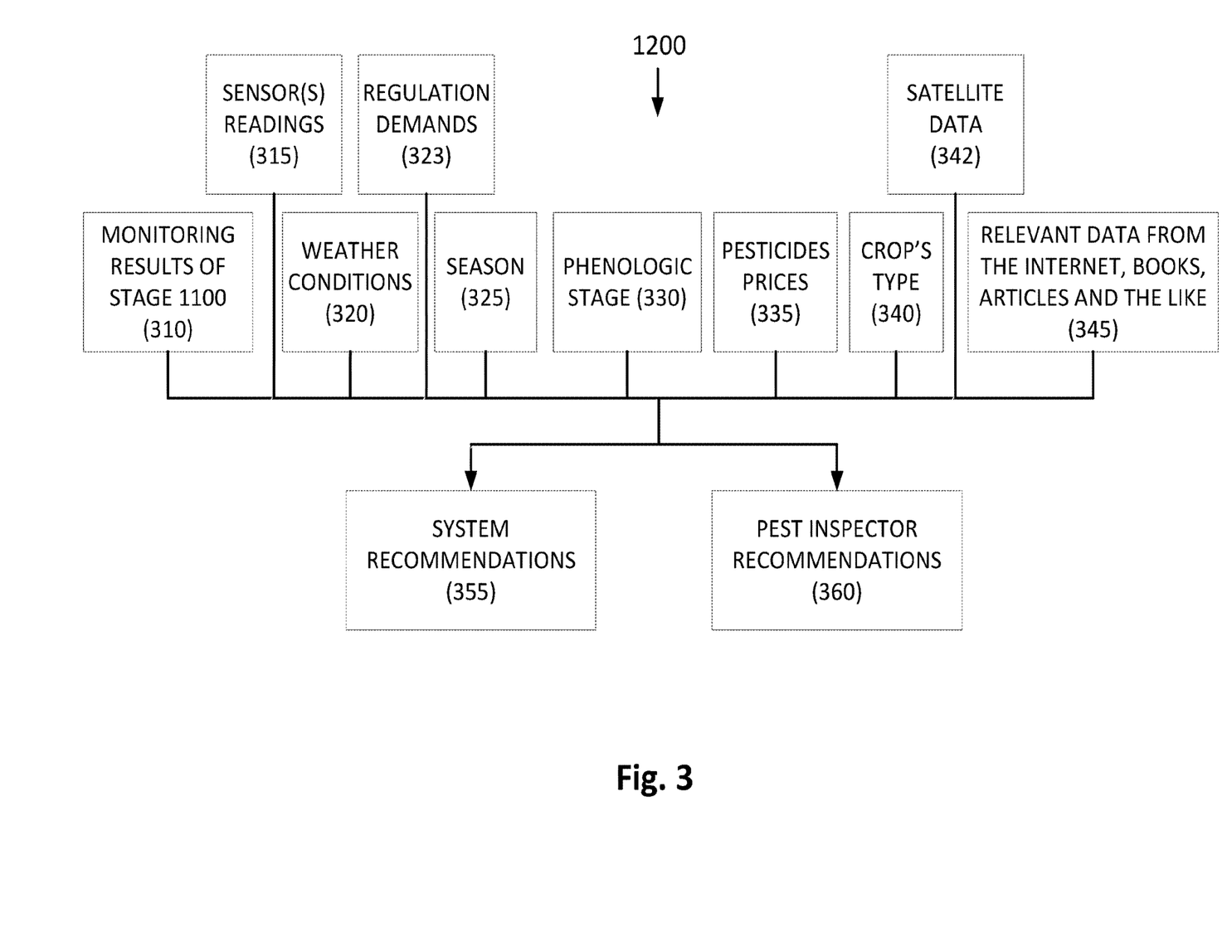
FIG. 3 is a flowchart showing the recommendation stage.

FIG. 3 is a flowchart showing the recommendation stage 1200. In order to provide or assist in providing recommendations, the recommendation stage may receive the monitoring results of stage 1100 (310), fixed and/or mobile sensor(s) readings (315), weather conditions (320), season (325), regulation demands (323), crop's phenologic stage (330), pesticides prices (335), crop's type (340), satellite data (342) or any other relevant data from relevant websites and from knowledge bases derived from books, articles and the like (345). Regulation demands may be for example limitations regarding the type of pesticide allowed to be used. For example, apples for export may require the use of pesticide(s) allowed in the designated country. According to these inputs, the system may provide recommendations (355). Alternatively, the system may present all the relevant data it has to the control advisor (PCA) and let him recommend (360). The recommendations may include the pesticide type(s), when to apply it (based on weather conditions for example), the amount of pesticide to be used, the pesticide concentration, which lot or which part of the lot needs a treatment, the recommended sprayer type, nozzles type, the number of nozzles to be open while spraying, the spraying pressure, the spraying or carrier's speed for best results, etc.

It will be appreciated that the recommendation stage is not limited to receiving all or only the described inputs (310-345).

It is better not to apply certain pesticides after others hence, the system may alert in case that the PCA recommends using such pesticide. For example, pesticide A is not recommended to be applied after pesticide B; if the lot has been sprayed with pesticide B and the PCA recommends using pesticide A, the system may alert.

Certain pesticides cannot be applied in certain countries (regulation demands) hence the system may alert in case that the PCA recommends using such pesticide.

According to embodiments of the invention, the system may alert if an implementation recommendation is made regarding a crop/lot which is configured to be harvested/picked.

According to embodiments of the invention, for optimization purposes, the system may alert when a lot is about to be sprayed with a pesticide that will have little to no influence. For example, if the lot has been sprayed with pesticide A, the system "knows" what will be the influence of pesticide B if sprayed after A, hence if the influence won't be sufficient or a different pesticide will provide better results, the system may alert and recommend changing the pesticide's type.

Figure 4:
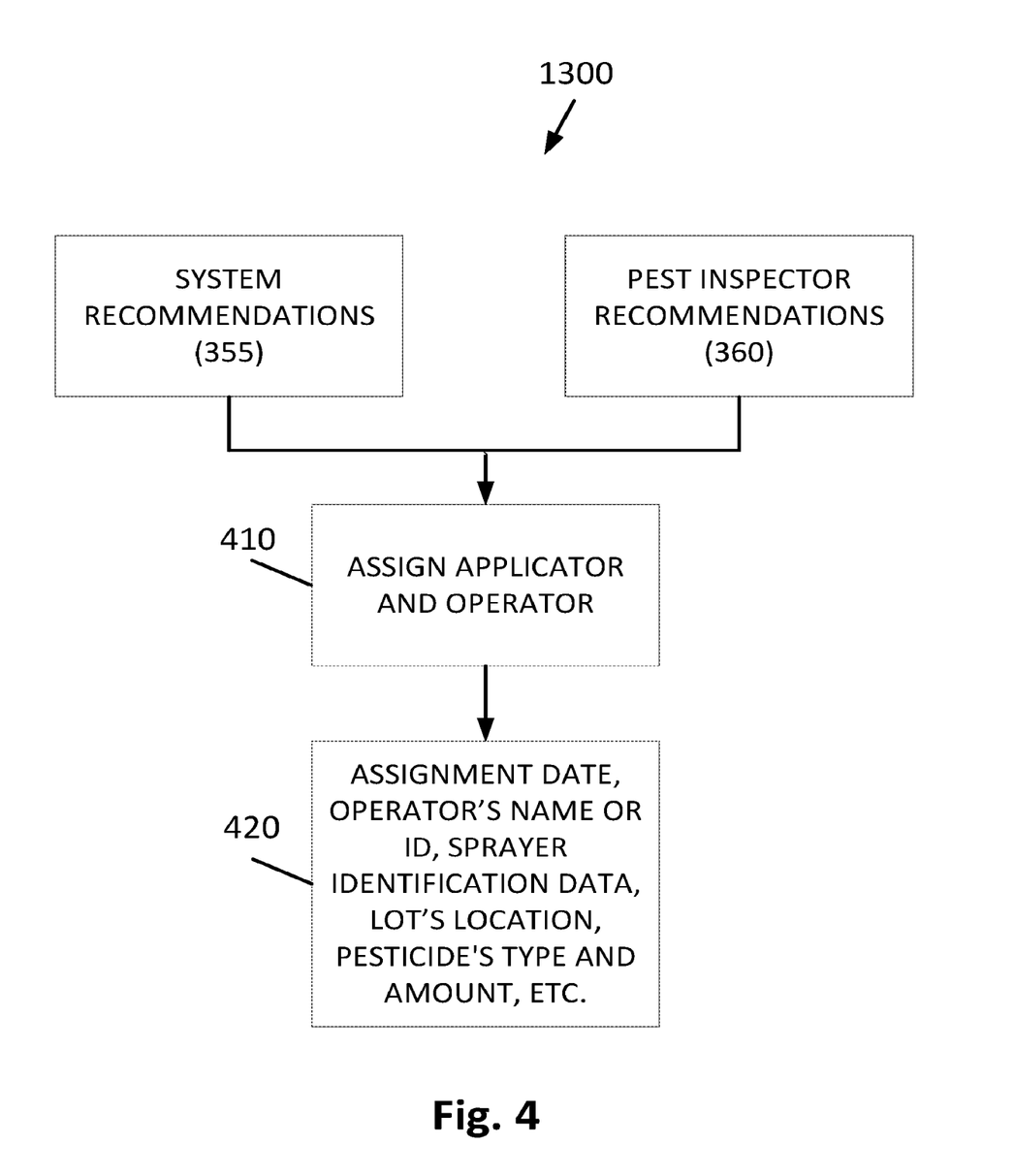
FIG. 4 is a flowchart showing the decision stage according to embodiments of the present invention.

FIG. 4 is a flowchart showing the decision stage 1300 according to embodiments of the invention. The inputs of the decision stage are the system recommendations 355 and/or the pest inspector recommendations 360. According to the recommendation(s), in step 410, the farmer, the lot(s) owner or any other person authorized to make decisions, assigns an applicator and an operator to each lot or each part of the lot according to the recommendation(s). Then, in step 420, each assignment (e.g. work plan) may get a date, operator's name or ID, the applicator's identification data, the lot's location, the pesticide's type, concentration and amount of pesticide to be used and all the relevant data regarding the sprayer's type, nozzles' type, the number of nozzles to be open while spraying, the spraying pressure, the spraying or carrier's speed for best result, etc.

According to embodiments of the invention, the system may provide the decision making person a list of similar pesticides (to the one recommended) in order for him to be able to choose the one he wants (e.g. the cheapest).

It will be appreciated that the assignment is not limited to include all or only the described data.

According to embodiments of the invention, the system may alert if an assignment is scheduled to be done in unsuitable conditions (e.g. on a bad weather day) or if a wrong applicator has been assigned to the assignment (each crop requires a certain applicator).

According to embodiments of the invention, the system may alert or change certain spraying parameters in real time during the spraying. For example, if during the spraying the weather conditions change, the system may instruct the operator to use more/less nozzles, increase/decrease the nozzles' pressure, change the spraying or carrier's speed or even stop the implementation in cases where the spraying will not have the expected effect.

According to embodiments of the invention, similar lots (similar crop, phenologic stage, etc.) may get the same recommendation in cases that the monitoring stage provides similar results.

Figure 5:
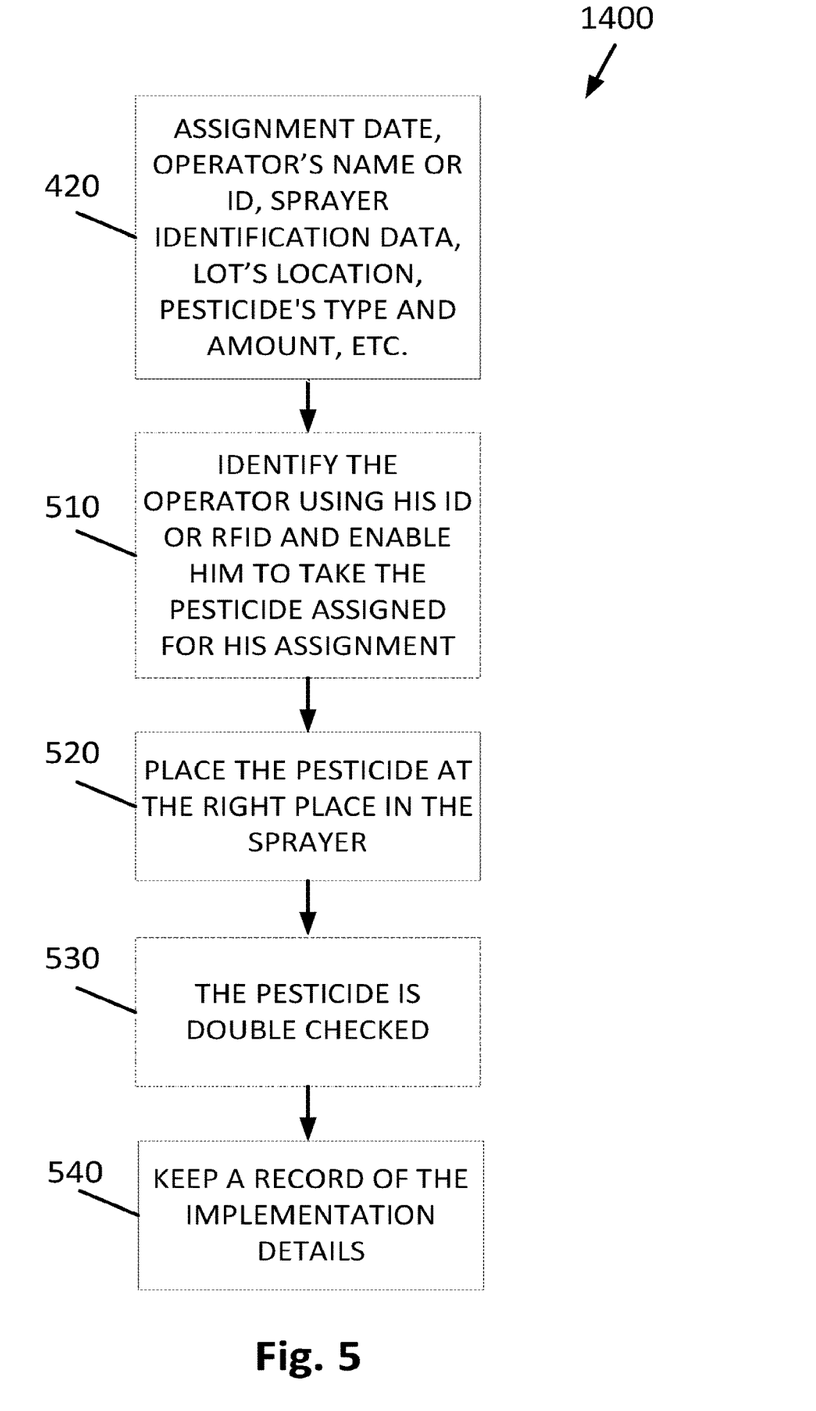
FIG. 5 is a flowchart showing the implementation stage according to embodiments of the present invention.

FIG. 5 is a flowchart showing the implementation stage 1400 according to embodiments of the invention. The implementation process is done according to the assignments of the decision stage 1300. According to embodiments of the present invention, the system may allow an operator to take a pesticide from the stock only if he attempts to take the "right" pesticide. The right pesticide is the one assigned to this specific operator according to his assignment. In step 510, the system may identify the operator using his ID or an RFID (Radio Frequency Identification) and enable him to take only the pesticide assigned for his assignment. For example, the operator may swipe his ID card through a designated card reader and the system allows him to open a specific section holding the pesticide assign to him according to the assignment. In step 520 the operator inserts the pesticide into the applicator (e.g. sprayer), preferably carried by a carrier (e.g. tractor). According to embodiments of the invention, in step 530, the pesticide type may be double checked by the applicator using an RFID for example. The applicator/carrier may also comprise location means such as a GPS which enables it to be directed through the lot by the system, or be monitored by the system through the path it takes. In addition, according to embodiments of the invention, the applicator and/or the carrier may have remote control means which enable it to be operated or at least partly operated from a distance. Using the location means and the remote control means, the system may activate or deactivate the applicator's nozzles according to the applicator's location. In step 540, the system keeps a record of the amount of pesticide that has been used, the nozzles flow rate, the applicator's/carrier's speed, the applicator's path along the lot, etc. as mentioned above, thus providing a closed loop (performance control) for the next monitoring stage 1100(1) of FIG. 2 or 1100(2) of FIG. 2A.

According to embodiments of the invention, the system may include sensors mounted on the carrier and directed towards the crops. The sensors are configured to capture the crops in real time and release the pesticide accordingly. For example, a smaller tree will be sprayed with less pesticide than a bigger one. According to embodiments of the invention, the system may process satellite images in real time and release the pesticide accordingly. The amount of pesticide to be released may be determined for example according to the tree's volume, the treetop's size, etc.

According to embodiments of the invention, the lot assigned to be sprayed may be divided into sections or fragments. Each section or fragment may be configured as a sub-assignment thus facilitating monitoring the completion of the assignment. Without the sections or fragments, the assignment is either "completed" or not. When using sections or fragments, some of the sub-assignment may be configured as "completed" and some not. The sections or fragments assist in providing more accurate assignment report.

It will be appreciated that the identification of the operator and enabling him to take only the pesticide assigned to him (step 510) is optional. Alternatively, the operator may take a pesticide without any identification process.

The applicators may comprise any kind of sprayer known in the art which may be carried by a person, a tractor, a crop duster (agricultural aircraft), a drone or a quadcopter or any other carrier known in the art.

According to embodiments of the invention, the system may be configured to control the nozzles flow rate, thus in slower speed—decrease the nozzles flow rate and in faster speed—increase the nozzles flow rate.

Using the nozzles flow rate, the applicator's/carrier's speed, the phenologic stage of the crop, the lot's size and the LAI (for example) the system may conclude the quality of pesticide coverage and the Spraying Week Spots (SWS). The SWS indicates locations where the spraying was not performed as recommended. The SWS may assisting directing the PCA to the spots that need treatment or represent the least treated locations.

The carrier's (e.g. tractor) speed may be derived from the carrier's motor by measuring its revolutions per minute (rpm), by measuring the number of wheel rotations per distance or by any other way known in the art.

According to embodiments of the invention, in order to identify implementation of a certain assignment, the system may be able to derive the carrier's power take off (PTO) condition and the applicator's activation switch condition. When the system recognizes that the PTO is ON, the switch is ON, there is a flow through the nozzles and the GPS samples more than a predetermined number of different samples (e.g. 4) it may conclude that an assignment has begun.

The minimum number of samples is used in order to be sure that an assignment actually begins in cases where the PTO and the switch had been turned ON by mistake. When the system identifies that an assignment has begun, it may automatically search for this assignment (e.g. according to the location). An assignment may be completed in one time or may be performed in parts. The system may alert that an assignment is not done after a predetermined time (e.g. three days). A completed assignment may be configured as a function of the percentage of coverage (e.g. 95% of the lot). When the assignment has been completed, the system may mark it as "DONE". By knowing the size of the lot and the distance between the rows the system may estimate the expected distance that the applicator/carrier should pass in order to complete the assignment. The system may conclude that an assignment is done by deriving the actual distance that the applicator/carrier has passed in the lot and comparing it to the expected distance.

If the system does not find the assignment, it may issue an alert notifying about it (e.g. wrong location (lot)).

According to embodiments of the invention, the operator may have a designated application which enables him to:
1. Be directed according to the optimal path in the lot.
2. In case he left an uncompleted assignment, see from where he has to continue spraying.
3. Receive notifications or alerts when he digresses from his path.
4. Receive notifications or alerts when he sprays a location that has been sprayed before.
5. Receive notifications or alerts when the weather conditions are bad for spraying.

It will be appreciated that this designated application is not limited to these five capabilities.

According to embodiments of the invention, the system may detect a resistance event. A resistance event describes the decreased susceptibility of a pest population to a pesticide that was previously effective at controlling the pest. The detection is made by monitoring the influence of the applied pesticide. For example, the PCA monitors 20 aphids (pest) per leaf at a first lot and 13 aphids per leaf at a second lot and recommends using a pesticide called Movento (for example). Next time, e.g. after a week, if the PCA returns to the same lots and finds 18 aphids per leaf at the first lot and 1 aphid per leaf at the second lot, the system may alert that a resistance event has probably occurred at the first lot. The system takes under consideration the applicator's type, pesticide coverage, wind, humidity, velocity, pesticide coverage, etc.

Figure 6:
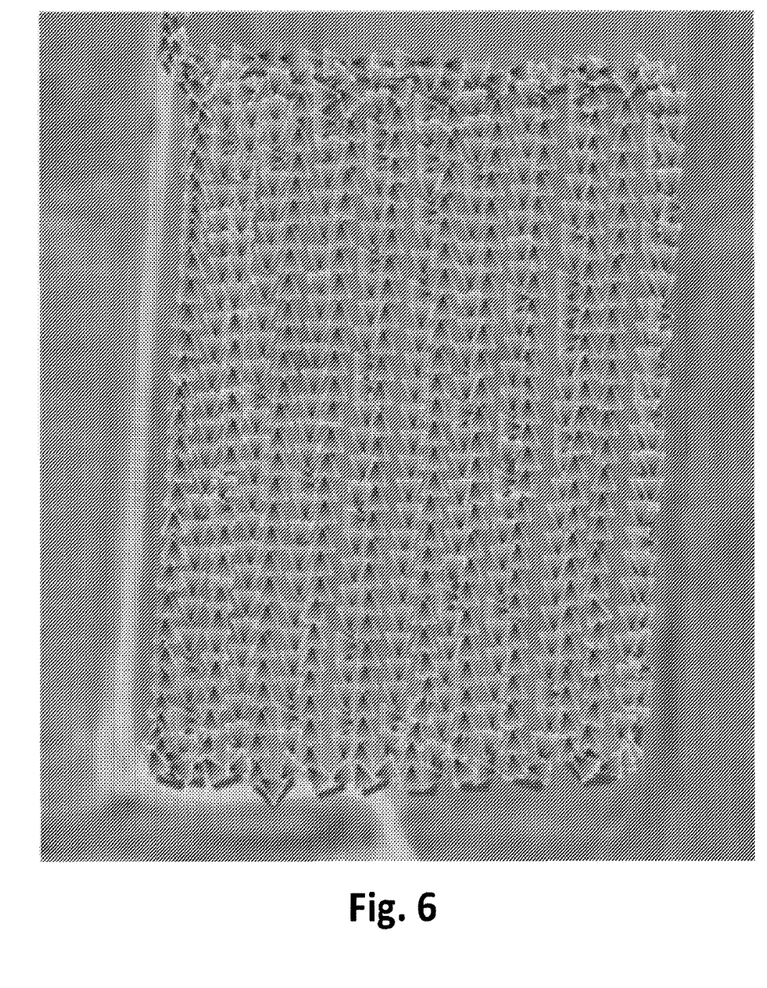
FIG. 6 shows an exemplary implementation map.

According to embodiments of the invention, the system may provide pest distribution map and/or implementation map. The pest distribution map may be created, for example, based on the detection of the resistance event. The implementation map may be created by monitoring the carrier's route using GPS for example. FIG. 6 shows an exemplary implementation map. According to embodiments of the invention, the map may show the sprayer's/carrier's route, location that it missed, locations where it passed twice, numeric indications of it speed, etc.

According to embodiments of the invention, the system receives from the carrier/sprayer data regarding the speed of the carrier/sprayer, the amount of pesticide used (flow meter), the carrier/sprayer location, etc. and other relevant data such as weather conditions e.g. temperature, wind velocity, etc. Using this data the system may conclude spraying quality. For example, wind above 10 Km/h in a certain crop, in a certain phenologic stage with a certain sprayer is a wind that may harm the spraying quality. In another example, the conclusion may be based on additional parameters such as the temperature in the lot and the type of pesticide used. Certain pesticides are sensitive to temperature, thus may function other than expected.

Each parameter may have its threshold(s). Combination of parameters may influence the threshold of some of these parameters.

An exemplary process:

According to an exemplary assignment, an implementation may be done with a sprayer having 56 sprinklers, with 400 liters of pesticide per acre and in a speed of 3.5 Km/h. As the sprayer arrives to the assigned lot and begins the implementation, the system constantly receives data regarding the implementation as mentioned above. At the beginning the wind velocity was 7 Km/h and the sprayer's average speed was 3.5 Km/h but after an hour (for example) the wind velocity increased to 12 Km/h and the sprayer's average speed increased to 5 Km/h thus influencing the spraying quality.

According to embodiments of the invention, the system may provide a numeric indication regarding the spraying quality (e.g. 0-1).

An exemplary formula may be:

$$\frac{\text{Time with parameter as expected}}{\text{Total spraying time}} + \frac{\text{Time with parameter not as expected}}{\text{Total spraying time} \cdot \text{FACTOR}}$$

Where, FACTOR represents the influence of the parameter on the spraying.

Each parameter may be calculated to provide its indication. The total indication may be, for example, the weighted average of all the parameters indications.

Alternatively, the system may provide a graphic representation of the spaying, namely, a user may be able to see where the spaying was as expected and where there was a decrease in the spraying quality. For example, in a similar map such as presented in FIG. 6 but with different colors according to the quality of spraying.

According to embodiments of the invention, the system may provide an implementation report. The report may include for example, the lot's details, the pesticide's type, the operator details, the recommendation from which the implementation was derived, the spraying details such as the weather conditions during the spraying, the number of nozzle used, the nozzles pressure, the carrier's speed, etc.

It will be appreciated that the implementation report is not limited to these specific examples and is not limited to include all of these examples.

It will be appreciated by persons skilled in the art that the present invention is not limited to what has been particularly shown and described hereinabove. Rather the scope of the present invention is defined by the appended claims and includes combinations and sub-combinations of the various features described hereinabove as well as variations and modifications thereof which would occur to persons skilled in the art upon reading the foregoing description.

The invention claimed is:

1. An apparatus, comprising:
   a processor; and
   a non-transitory memory storing instructions which, when executed by the processor, cause the processor to:
   capture a first plurality of images via a plurality of cameras positioned in a lot;
      wherein the lot comprises at least one type of crop;
   receive crop data for the at least type of crop in the lot from a crop database;
      wherein the crop data for the at least type of crop in the lot comprises:
         (i) a history of the lot,
         (ii) biological reference data for the at least one type of crop,
         (iii) phenological reference data for the at least one type of crop,
         (iv) at least one suspected type of pest to search for in the lot,
         (v) at least one suggested location in the lot to search for the at least one suspected type of pest, and
         (vi) pest control data for eradicating the at least one suspected type of pest;
   utilize, a pest determination image process to determine from the first plurality of images, a phenological and biological stage of the at least one type of crop based at least in part on:
   (i) the image processing data,
   (ii) the biological reference data for the at least one type of crop, and
   (iii) the phenological reference data for the at least one type of crop;
   transmit to the plurality of cameras, monitoring instructions based on the phenological and biological stage of the at least one type of crop;
      wherein the monitoring instructions comprise the at least one suggested location in the lot to search for the at least one suspected type of pest;
   capture image data of a second plurality of images via the plurality of cameras based on the monitoring instructions;
   utilize an infection-determination image process to extract, based on the image data of each image from the second plurality of images, an extent of an infection of at least one verified type of pest located in at least one verified location in the lot that is verified by applying, to the infection-determination image process, the image data of each image from the second plurality of images, comprising the at least one suspected type of pest at the at least one suggested location;
   generate a pest control implementation plan, based on the at least one verified type of pest at the at least one verified location in the lot and the pest control data, and comprising:
      (i) at least one type of pesticide,
      (ii) a concentration of the at least one type of pesticide,
      (iii) an amount of the at least one type of pesticide to eradicate the at least one verified type of pest,
      (iv) sprayer data for a plurality of pesticide spraying nozzles for spraying the at least one verified type of pest in the lot, and
      (v) a speed of a carrier to dispense the at least one verified type of pest at the at least one verified location in the lot;
   generate instructions for the carrier to execute the pest control implementation plan;
      wherein the instructions comprise a plurality of commands to control:
         (i) the carrier to travel a path to execute the pest control implementation plan to spray the at least one verified type of pest in the at least one verified location in the lot, and
         (ii) a plurality of pesticide spraying nozzles mounted in the carrier for delivering the at least one type of pesticide along the path; and
   monitor the path travelled by the carrier in the lot to determine that the pest control implementation plan has been executed.

2. The apparatus of claim 1, wherein in the instructions further cause the processor to:
   detect a change of weather condition while the carrier executes the pest control implementation plan; and
   change the plurality of commands to control the plurality of pesticide spraying nozzles based on the change of a weather condition causing the carrier to control the plurality of pesticide spraying nozzles based on the change of the plurality of commands.

3. The apparatus of claim 1, wherein in the instructions further cause the processor to:
   generate a pest distribution map of the lot that indicates a resistance event;
      wherein the resistance event indicates a decrease of susceptibility of the at least one type of pest to the at least one type of pesticide; and
      wherein the pest distribution map is generated at least in part based on a monitored traveled route of the carrier while the carrier executes the pest control implementation plan.

4. The apparatus of claim 1, further comprising a display; and wherein in the instructions further cause the processor to:
   receive from the carrier, pest control implementation plan data comprising a speed of the carrier at which the carrier traveled the path during an execution of the pest control implementation plan, an amount of the at least one type of pesticide used during the execution of the pest control implementation plan, and a carrier location during the execution of the pest control implementation plan;
   generate, based on the pest control implementation plan data, a graphical representation of the spraying in the lot associated with the executed pest control implementation plan; and
   display the graphical representation on the display;
      wherein the graphical representation displays a map of the lot showing regions in the lot where the spraying was in accordance with the executed pest control implementation plan, and other regions in the lot where the spraying was not in accordance with the executed pest control implementation plan.

5. The apparatus of claim 1, wherein the pest control implementation plan further comprises: a) a time to apply the at least one type of pesticide, b) a number of spraying nozzles to be open from the plurality of pesticide spraying nozzles while the carrier travels the path to execute the pest control implementation plan, and c) a spraying pressure of the plurality of pesticide spraying nozzles.

6. The apparatus of claim 1, wherein the pest control implementation plan is further based at least in part on a previously executed pest control implementation plan.

7. The apparatus of claim 1, wherein the carrier comprises a drone, a quadcopter, or any combination thereof.

8. A method, comprising:
capturing, by a processor, a first plurality of images via a plurality of cameras positioned in a lot;
wherein the lot comprises at least one type of crop;
receiving, by the processor, crop data for the at least one type of crop in the lot from a crop database;
wherein the crop data for the at least one type of crop in the lot comprises:
(i) a history of the lot,
(ii) biological reference data for the at least one type of crop,
(iii) phenological reference data for the at least one type of crop,
(iv) at least one suspected type of pest to search for in the lot,
(v) at least one suggested location in the lot to search for the at least one suspected type of pest, and,
(vi) pest control data for eradicating the at least one suspected type of pest;
utilizing, by the processor, a pest determination image process to determine, from the first plurality of images, a phenological and biological stage of the at least one type of crop based at least in part on:
(i) the image processing data,
(ii) the biological reference data for the at least one type of crop, and
(iii) the phenological reference data for the at least one type of crop;
transmitting, by the processor, to the plurality of cameras, monitoring instructions based on the phenological and biological stage of the at least one type of crop;
wherein the monitoring instructions comprise the at least one suggested location in the lot to search for the at least one suspected type of pest;
capturing, by the processor, image data of a second plurality of images via the plurality of cameras based on the monitoring instructions;
utilizing, by the processor, an infection-determination image process to extract, based on the image data of each image from the second plurality of images, an extent of an infection of at least one verified type of pest located in at least one verified location in the lot that is verified by applying, to the infection-determination image process, the image data of each image from the second plurality of images, comprising the at least one suspected type of pest at the at least one suggested location;
generating, by the processor, a pest control implementation plan, based on the at least one verified type of pest at the at least one verified location in the lot and the pest control data, and comprising:
(i) at least one type of pesticide,
(ii) a concentration of the at least one type of pesticide,
(iii) an amount of the at least one type of pesticide to eradicate the at least one verified type of pest,
(iv) sprayer data for a plurality of pesticide spraying nozzles for spraying the at least one verified type of pest in the lot, and
(v) a speed of a carrier to dispense the at least one verified type of pest at the at least one verified location in the lot;
generating, by the processor, instructions for the carrier to execute the pest control implementation plan;
wherein the instructions comprise a plurality of commands to control:
(i) the carrier to travel a path to execute the pest control implementation plan to spray the at least one verified type of pest in the at least one verified location in the lot, and
(ii) a plurality of pesticide spraying nozzles mounted in the carrier for delivering the at least one type of pesticide along the path; and
monitoring, by the processor, the path travelled by the carrier in the lot to determine that the pest control implementation plan has been executed.

9. The method of claim 8, further comprising:
detecting, by the processor, a change of weather condition while the carrier executes the pest control implementation plan; and
changing, by the processor, the plurality of commands to control the plurality of pesticide spraying nozzles based on the change of a weather condition causing the carrier to control the plurality of pesticide spraying nozzles based on the change of the plurality of commands.

10. The method of claim 8, further comprising:
generating, by the processor, a pest distribution map of the lot that indicates a resistance event;
wherein the resistance event indicates a decrease of susceptibility of the at least one type of pest to the at least one type of pesticide; and
wherein the pest distribution map is generated at least in part based on a monitored traveled route of the carrier while the carrier executes the pest control implementation plan.

11. The method of claim 8, further comprising:
receiving, by the processor, from the carrier, pest control implementation plan data comprising a speed of the carrier at which the carrier traveled the path during the execution of the pest control implementation plan, an amount of the at least one type of pesticide used during the execution of the pest control implementation plan, and a carrier location during the execution of the pest control implementation plan;
generating, by the processor, based on the pest control implementation plan data, a graphical representation of the spraying in the lot associated with the executed pest control implementation plan; and
displaying, by the processor, the graphical representation on the display;
wherein the graphical representation displays a map of the lot showing regions in the lot where the spraying was in accordance with the executed pest control implementation plan, and other regions in the lot where the spraying was not in accordance with the executed pest control implementation plan.

12. The method of claim 8, wherein the pest control implementation plan further comprises: a) a time to apply the at least one type of pesticide, b) a number of spraying nozzles to be open from the plurality of pesticide spraying nozzles while the carrier travels the path to execute the pest control implementation plan, and c) a spraying pressure of the plurality of pesticide spraying nozzles.

13. The method of claim 8, wherein the pest control implementation plan is further based at least in part on a previously executed pest control implementation plan.

14. The method of claim 8, wherein the carrier comprises a drone, a quadcopter, or any combination thereof.

15. A non-transitory computer readable medium storing instructions which, when executed by a processor, cause the processor to:
  capture a first plurality of images via a plurality of cameras positioned in a lot;
    wherein the lot comprises a at least one type of crop;
  receive crop data for the at least one type of crop in the lot from a crop database;
    wherein the crop data for the at least one type of crop in the lot comprises:
      (i) a history of the lot,
      (ii) biological reference data for the at least one type of crop,
      (iii) phenological reference data for the at least one type of crop,
      (iv) at least one suspected type of pest to search for in the lot,
      (v) at least one suggested location in the lot to search for the at least one suspected type of pest, and,
      (vi) pest control data for eradicating the at least one suspected type of pest;
  utilize, a pest determination image process to determine from the first plurality of images, a phenological and biological stage of the at least one type of crop based at least in part on:
  (i) the image processing data,
  (ii) the biological reference data for the at least one type of crop, and
  (iii) the phenological reference data for the at least one type of crop;
  transmit to the plurality of cameras, monitoring instructions, based on the phenological and biological stage of the at least one type of crop;
    wherein the monitoring instructions comprise the at least one suggested location in the lot to search for the at least one suspected type of pest;
  capture image data of a second plurality of images via the plurality of cameras based on the monitoring instructions;
  utilize an infection-determination image process to extract, based on the image data of each image from the second plurality of images, an extent of an infection of at least one verified type of pest located in at least one verified location in the lot that is verified by applying, to the infection-determination image process, the image data of each image from the second plurality of images, comprising the at least one suspected type of pest at the at least one suggested location;
  generate a pest control implementation plan, based on the at least one verified type of pest at the at least one verified location in the lot and the pest control data, and comprising:
  (i) at least one type of pesticide,
  (ii) a concentration of the at least one type of pesticide,
  (iii) an amount of the at least one type of pesticide to eradicate the at least one verified type of pest,
  (iv) sprayer data for a plurality of pesticide spraying nozzles for spraying the at least one verified type of pest in the lot, and
  (v) a speed of a carrier to dispense the at least one verified type of pest at the at least one verified location in the lot;
  generate instructions for the carrier to execute the pest control implementation plan;
    wherein the instructions comprise a plurality of commands to control:
      the carrier to travel a path to execute the pest control implementation plan to spray the at least one verified type of pest in the at least one verified location in the lot, and (ii) a plurality of pesticide spraying nozzles mounted in the carrier for delivering the at least one type of pesticide along the path; and monitor the path travelled by the carrier in the lot to determine that the pest control implementation plan has been executed.

16. The non-transitory computer readable medium of claim 15, wherein in the instructions further cause the processor to:

detect a change of weather condition while the carrier executes the pest control implementation plan; and change the plurality of commands to control the plurality of pesticide spraying nozzles based on the change of a weather condition causing the carrier to control the plurality of pesticide spraying nozzles based on the change of the plurality of commands.

17. The non-transitory computer readable medium of claim 15, wherein in the instructions further cause the processor to:

generate a pest distribution map of the lot that indicates a resistance event;

wherein the resistance event indicates a decrease of susceptibility of the at least one type of pest to the at least one type of pesticide; and wherein the pest distribution map is generated at least in part based on a monitored traveled route of the carrier while the carrier executes the pest control implementation plan.

18. The non-transitory computer readable medium of claim 15, wherein in the instructions further cause the processor to:

receive from the carrier pest control implementation plan data comprising a speed of the carrier at which the carrier traveled the path during the execution of the pest control implementation plan, an amount of the at least one type of pesticide used during the execution of the pest control implementation plan, and an carrier location during the execution of the pest control implementation plan;

generate, based on the pest control implementation plan data, a graphical representation of the spraying in the lot associated with the executed pest control implementation plan; and display the graphical representation on the display;

wherein the graphical representation displays a map of the lot showing regions in the lot where the spraying was in accordance with the executed pest control implementation plan, and other regions in the lot where the spraying was not in accordance with the executed pest control implementation plan.

19. The non-transitory computer readable medium of claim 15, wherein the pest control implementation plan further comprises: a) a time to apply the at least one type of pesticide, b) a number of spraying nozzles to be open from the plurality of pesticide spraying nozzles while the carrier travels the path to execute the pest control implementation plan, and c) a spraying pressure of the plurality of pesticide spraying nozzles.

20. The non-transitory computer readable medium of claim 15, wherein the carrier comprises a drone, a quadcopter, or any combination thereof.

* * * * *